No. 730,746. PATENTED JUNE 9, 1903.
M. R. CONLEY.
ART OF MAKING STEEL DIRECT FROM IRON ORE.
APPLICATION FILED JAN. 27, 1902.
NO MODEL.
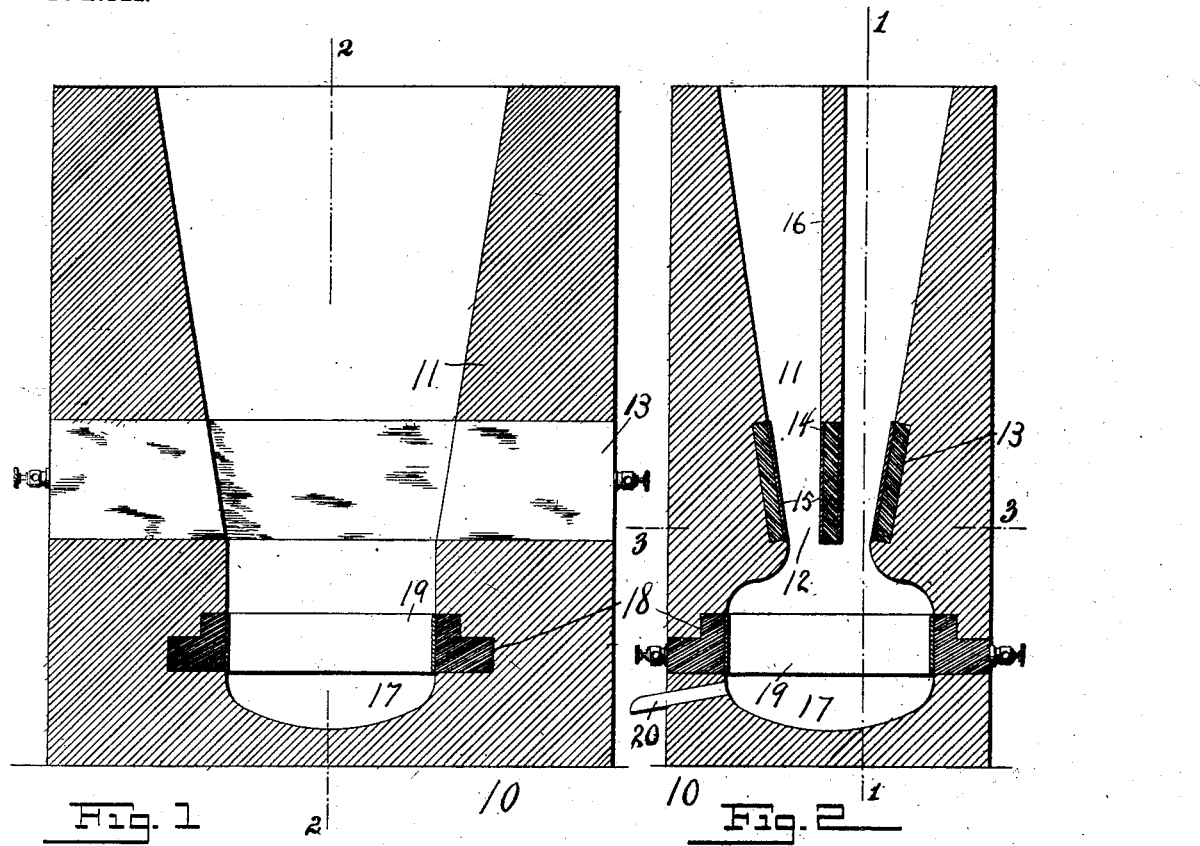
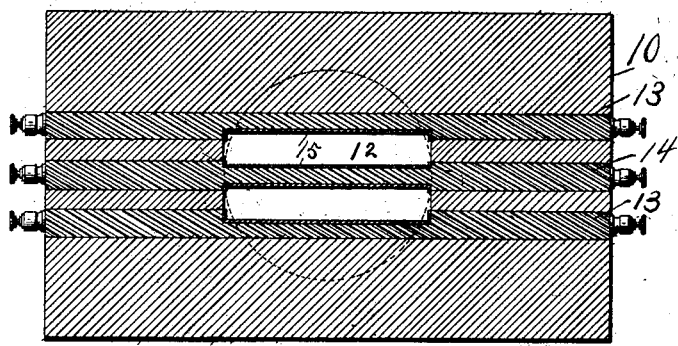
WITNESSES:
INVENTOR
Michael R. Conley.
BY
W. B. Hutchinson.
ATTORNEY No. 730,746. Patented June 9, 1903.

UNITED STATES PATENT OFFICE.

MICHAEL R. CONLEY, OF BROOKLYN, NEW YORK, ASSIGNOR TO ELECTRIC FURNACE COMPANY, OF NEW YORK, N. Y., A CORPORATION OF NEW YORK.

ART OF MAKING STEEL DIRECT FROM IRON ORE.

SPECIFICATION forming part of Letters Patent No. 730,746, dated June 9, 1903.

Application filed January 27, 1902. Serial No. 91,357. (No specimens.)

*To all whom it may concern:*

Be it known that I, MICHAEL R. CONLEY, of New York, (Brooklyn,) county of Kings, State of New York, have invented certain new and useful Improvements in the Art of Making Steel Direct from Iron Ore or Oxid, of which the following is a full, clear, and exact description.

My invention relates to improvements in steel manufacture; and the object of my invention is to produce steel direct from the iron ore or oxid without any intervening process or processes.

Where iron ore is melted in a blast-furnace, it is impossible to produce steel without first reducing the ore to pig-iron, as there is no means of controlling to a nicety the amount of carbon in the product, owing to the fact that a large amount of carbon has to be used with the ore and with a blast of air to produce the necessary heat, and as a result there is such an excess of carbon in the product as to make it pig-iron. I am aware that in so-called "direct" processes ore has been used mingled with scrap-iron and other products; but my invention contemplates reducing the ore directly to ingot-steel. To do this, I use an electric furnace which can be closed so as to shut out any extraneous supply of oxygen, make an analysis of the ore to find out the amount of oxygen contained, then mingle with the ore sufficient carbon to combine with the oxygen and pass off as gas, with perhaps a very slight excess of carbon, and then heat the mass electrically and draw off the melted metal, which in this case is so low in carbon as to be an ingot-steel of fair quality.

In carrying out my invention no specific form of furnace is necessary, but I have illustrated the type which I deem preferable.

With these ends in view my invention consists of an improvement in the art of making steel, which will be hereinafter fully described and claimed.

Reference is to be had to the accompanying drawings, in which similar figures of reference refer to similar parts throughout the several views.

Figure 1 is a vertical section on the line 1 1 of Fig. 2 of a furnace suitable for carrying out my improvement. Fig. 2 is a vertical section on the line 2 2 of Fig. 1, and Fig. 3 is a sectional plan on the line 3 3 of Fig. 2.

The essential features of the apparatus are that the furnace be capable of being substantially closed and that electrical means be provided for melting the ore. To this end I have shown a furnace 10 of a common form, which can be made of fire-clay or suitable masonry, this having the upper ore-containing body 11, which discharges downward through the neck 12 to the hearth 17 below. In the neck of the furnace are transverse heating-plates 13 of low electrical conductivity, the two plates 13 being inclined inward and extending entirely through the furnace, the said plates forming two walls of the neck. Arranged vertically between the plates 13 is a similar plate 14, the surfaces of both plates being preferably protected by some refractory material, such as magnesite or dolomite, as shown at 15, to the end that the plates may not be attacked by the oxygen and too rapidly consumed. The middle plate 15 is protected by a vertical central wall 16, of masonry or fire-clay, and all the plates are reduced where they extend across the furnace-neck, as shown clearly in Fig. 3, to the end that there may be more resistance in the central part of the plates, so that they may be heated to the necessary extent. As to the composition of these plates I have found by experimenting that the best material is a composition of approximately seventy-five per cent. fire-clay and twenty-five per cent. plumbago. This material is of low electrical conductivity, and when the current is passed through it it heats quickly to incandescence.

Around the hearth 17 I place a band 18, of similar material to the plates 13 and 14, this band being protected by an inner coating 19, like the coating 15, already described, and both the plates 13 and 14 and band 18 are provided with suitable connections, so that electric wires may be attached.

In practice the furnace may be closed at the top, although when filled with ore the upper portion of the ore forms a closure which prevents exterior oxygen from getting at the neck 12, where the melting takes place.

In using the furnace the ore is crushed, as usual, and by analysis I ascertain the amount of oxygen contained, then thoroughly mingle and incorporate with the ore sufficient carbon to combine with the oxygen, so that under the influence of heat the oxygen and carbon will pass off as carbonic oxid, though preferably a slight excess of carbon is used, so that the resulting material will contain, say, one per cent. or less of carbon. It will be seen that this can be very easily accomplished and that it is impossible to do it in a furnace where a blast and large quantity of carbon is used to reduce the ore.

I have shown the hearth 17 provided with the usual tap-hole 20, so that the melted metal can be withdrawn as desired, and the object of the band 18 is to prevent the molten metal from chilling or cooling.

My process, it will be seen from the foregoing description, is adapted to be used in reducing any iron oxid and any character of ore, it being especially adapted for use in the reduction of fine concentrates. This is important in many ways. Besides being able to reduce the concentrates direct to steel I can use them in their fine form without necessitating the bricking of them, which is a common practice where such concentrates are reduced in the ordinary way. It will be further observed that as the reduction takes place in a closed receptacle there is no possibility of any foreign or extraneous matters or gases coming in contact with the material, as nothing can get in except the charge. Consequently I am able to get at the desired result.

I am aware that attempts have been made to produce steel direct from iron ore by melting it in the crucible and mingling with the ore the necessary ingredients, these ingredients usually including fluxes and some metal, steel or iron; but structures of this kind are not commercially practicable, as it is too difficult a matter to control the process and to tap out or draw out the molten metal. It will be noticed that my process, however, provides for a continuous flow of metal from the melting ore to the hearth below, and here it can be treated as in the hearth of an open-hearth furnace, so as to give it the necessary or desired characteristics—as, for instance, by the introduction of manganese, titanium, or other substances. In my process the production of steel is practically continuous. As the ore melts the molten metal passes to the hearth below, the heat is kept up here, and the metal can be tapped off as fast as it accumulates to the desired extent. It will be further observed that it is perfectly feasible to draw off the metal into ingots which are suitable for the rolls or hammer.

In the claims where I use the word "ore" I mean to use it comprehensively as embracing any oxid of iron.

Having thus described my invention, what I claim as new, and desire to secure by Letters Patent, is—

1. The improvement in the art of making steel from iron ore, which consists in mingling with the ore sufficient carbon to essentially combine with the oxygen of the ore when heated and pass off as carbonic oxid, and then melting the mass in an essentially-closed furnace by feeding it through a heated belt or zone of higher temperature than is obtainable in an ordinary blast-furnace to a retaining-hearth.

2. The improvement in the art of making steel from iron ore, which consists in mingling with the crushed ore sufficient carbon to essentially combine with the oxygen of the ore under the influence of heat and pass off as carbonic oxid, then melting the mass without pressure in an essentially-closed furnace by feeding the materials over incandescent plates of higher temperature than is obtainable in an ordinary blast-furnace, and accumulating the molten material in a hearth below the said plates.

3. The herein-described improvement in the art of making steel, which consists in mingling with the crushed ore sufficient carbon to essentially combine with the oxygen of the ore under the influence of heat, then melting the mingled materials in an essentially-closed furnace by feeding the said material through an electric field containing incandescent plates of higher temperature than is obtainable in an ordinary blast-furnace.

4. The herein-described improvement in the art of making steel direct from iron ore, which consists in mingling with crushed ore sufficient carbon to essentially combine with the oxygen of the ore under the influence of heat, melting the mass in an essentially-closed furnace by feeding it through a heated zone or belt of higher temperature than is obtainable in an ordinary blast-furnace, collecting the molten material in a heated hearth below the said zone or belt, and then tapping off the bath.

5. The herein-described improvement in the art of making steel direct from iron ore, which consists in mingling with the crushed ore sufficient carbon to essentially combine with the oxygen of the ore under the influence of heat, melting the mass in an essentially-closed furnace by feeding it through a heated zone or belt of higher temperature than is obtainable in an ordinary blast-furnace thus simultaneously combining the oxygen and carbon and melting the ore, and collecting the molten material in a heated hearth below the said zone or belt.

6. The herein-described improvement in the art of making steel direct from iron ores which consists in mingling with the crushed ore a small percentage more carbon than will chemically combine with the oxygen of the ore, then melting the mass by and passing it over or through an electrically-heated belt or zone of higher temperature than is obtainable in an ordinary blast-furnace in an essentially-closed furnace, and then collecting the molten material below said belt or zone.

7. The herein-described improvement in the art of making steel direct from iron ore, which consists in first mingling with the ore sufficient carbon to combine with the oxygen under heat and deoxidize the ore, next inclosing the mass without pressure in a furnace the walls of which are of resisting material adapted to grow incandescent on the passage of an electric current through them, and finally forcing a current through the said resisting-walls for a sufficient time to raise the temperature to a point higher than is obtainable in an ordinary blast-furnace to melt the mass.

8. The improvement in the art of producing iron or steel direct from the ore and without the aid of fluxes, which consists in placing such ore in an electric furnace, adding thereto sufficient carbon to unite with all the oxygen of said ore and to produce the product desired, and then subjecting the mixture to a temperature higher than is obtainable in an ordinary blast-furnace and sufficient to reduce the iron to a metallic state, substantially as described.

In testimony whereof I have signed my name to this specification in the presence of two subscribing witnesses.

MICHAEL R. CONLEY.

In presence of—
WARREN B. HUTCHINSON,
THERON DAVIS.